US009311372B2

(12) United States Patent
Garera et al.

(10) Patent No.: US 9,311,372 B2
(45) Date of Patent: Apr. 12, 2016

(54) PRODUCT RECORD NORMALIZATION SYSTEM WITH EFFICIENT AND SCALABLE METHODS FOR DISCOVERING, VALIDATING, AND USING SCHEMA MAPPINGS

(71) Applicant: Wal-Mart Stores, Inc., Bentonville, AR (US)

(72) Inventors: Nikesh Lucky Garera, Mountain View, CA (US); Narasimhan Rampalli, Los Altos, CA (US); Dintyala Venkata Subrahmanya Ravikant, San Bruno, CA (US); Srikanth Subramaniam, San Jose, CA (US); Chong Sun, Redwood City, CA (US); Heather Dawn Yalin, Alameda, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 374 days.

(21) Appl. No.: 13/907,243

(22) Filed: May 31, 2013

(65) Prior Publication Data
US 2014/0358931 A1 Dec. 4, 2014

(51) Int. Cl.
*G06F 7/00* (2006.01)
*G06F 17/30* (2006.01)

(52) U.S. Cl.
CPC ............... *G06F 17/30569* (2013.01)

(58) Field of Classification Search
None
See application file for complete search history.

(56) References Cited

U.S. PATENT DOCUMENTS

| | | | |
|---|---|---|---|
| 5,960,430 A | 9/1999 | Haimowitz | |
| 6,366,890 B1 | 4/2002 | Usrey | |
| 7,308,458 B2 | 12/2007 | Vincent, III | |
| 7,672,877 B1 | 3/2010 | Acton | |
| 7,680,867 B2 | 3/2010 | Green | |
| 7,822,768 B2 | 10/2010 | Maymir-Ducharme | |
| 8,412,656 B1 | 4/2013 | Baboo | |
| 8,452,785 B1 | 5/2013 | Iida | |
| 8,463,805 B2 | 6/2013 | Osborn | |
| 8,483,370 B2 | 7/2013 | Musko | |
| 8,582,802 B2 | 11/2013 | Clippard | |
| 2005/0028109 A1 | 2/2005 | Richards | |
| 2005/0197883 A1 | 9/2005 | Kettner | |
| 2008/0052102 A1 | 2/2008 | Taneja | |
| 2008/0212899 A1* | 9/2008 | Gokturk et al. | 382/305 |
| 2012/0117072 A1* | 5/2012 | Gokturk et al. | 707/740 |
| 2012/0254179 A1 | 10/2012 | Cao | |
| 2014/0129280 A1 | 5/2014 | Montero | |

FOREIGN PATENT DOCUMENTS

WO    WO2012071543 A2    5/2012

\* cited by examiner

*Primary Examiner* — Mohammad Rostami
*Assistant Examiner* — Thu Nga Nguyen
(74) *Attorney, Agent, or Firm* — Bryan Cave LLP

(57) ABSTRACT

Systems and methods are disclosed herein for generating a normalized record from an import record, the normalized record having attribute-value pairs corresponding to a native schema. In import records, a plurality of attribute-value are identified each having an attribute label not found in a native schema. One or more attribute labels in the native schema having as possible values one or more values corresponding to the values of the plurality of attribute-value pairs are also identified. The computer system generates one or more normalization rules relating one or more attribute labels of the plurality of attribute-value pairs to at least a portion of the one or more attribute labels in the native schema. Normalization rules may be validated by crowdsourcing. Normalization rules may be applied by identifying implicated rules by classifying the import record and identifying rules applicable to the classification.

14 Claims, 7 Drawing Sheets

PRODUCT RECORD NORMALIZATION SYSTEM WITH EFFICIENT AND SCALABLE METHODS FOR DISCOVERING, VALIDATING, AND USING SCHEMA MAPPINGS

FIELD OF THE INVENTION

This invention relates to systems and methods for translating structured data from one schema into a different schema.

BACKGROUND OF THE INVENTION

Many attempts have been made to automatically classify documents or otherwise identify the subject matter of a document. In particular, search engines seek to identify documents that are relevant to the terms of a search query based on determinations of the subject matter of the identified documents. Another area in which classification of documents is important is in the area of product-related documents such as product descriptions, product reviews, or other product-related content. The number of products available for sale constantly increases and the number of documents relating to a particular product is further augmented by social media posts relating to products and other content.

Often, a document describing a product includes unstructured data, e.g. free-form text by a manufacturer, retailer, expert, enthusiast, or the like. However, such text is not readily used to compare products. For example, a customer wishing to comparison shop is burdened with extracting relevant information from this unstructured data in order to make an informed decision. In other instances, a product record may include structured data that has a different labeling schema than product records in another schema.

In view of the foregoing, it would be an advancement in the art to provide methods for relating structured data from different schemas as well as generating structured representation of unstructured data, particularly product-related documents.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
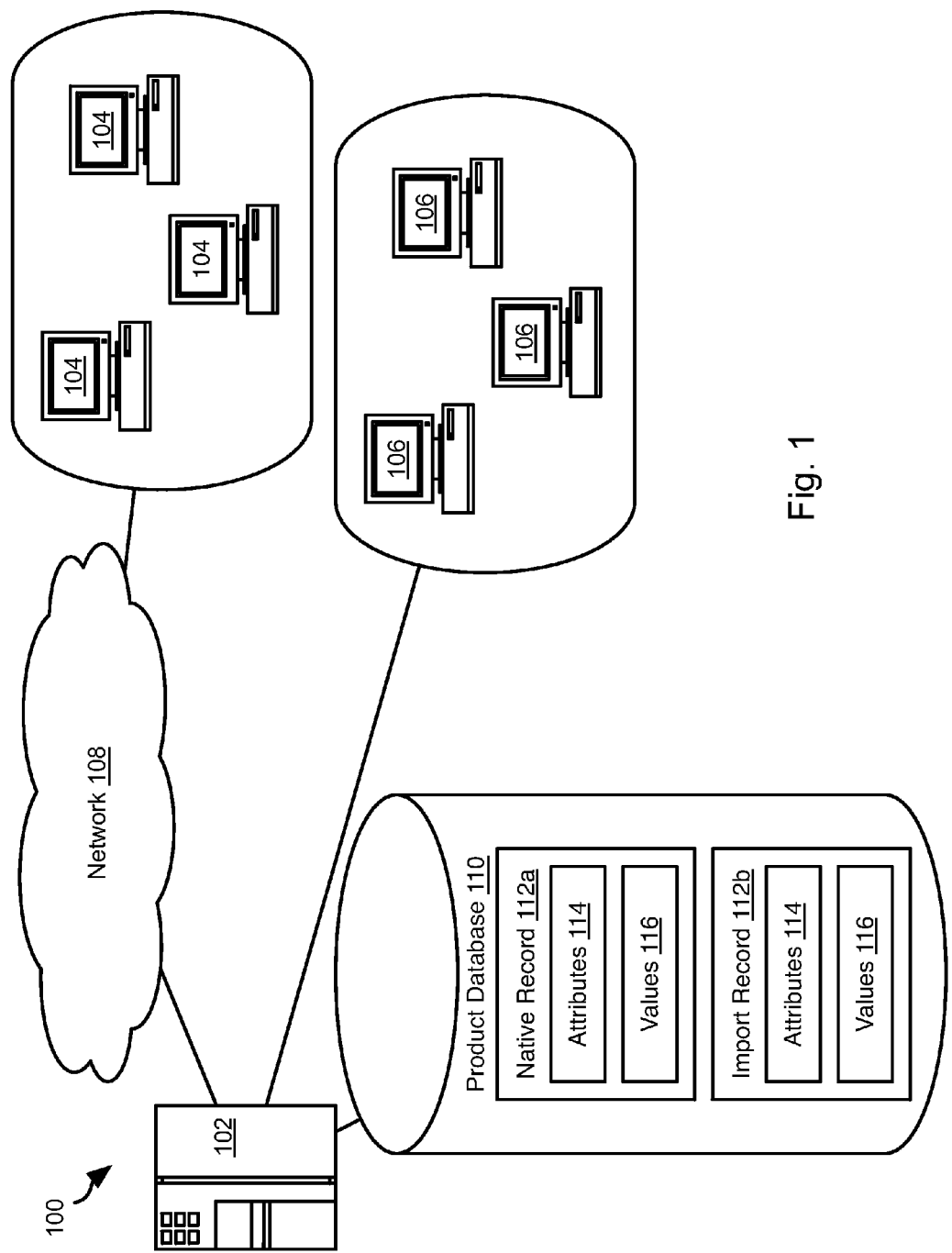
FIG. 1 is a schematic block diagram of a system for performing methods in accordance with embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include one or more server systems 102 that may each be embodied as one or more server computers each including one or more processors that are in data communication with one another. The server system 102 may be in data communication with one or more analyst workstations 104 and one or more crowdsourcing workstations 106. In the methods disclosed herein, the analyst workstations 104 and crowdsourcing workstations 106 may be embodied as mobile devices such as a mobile phone or tablet computer.

In some embodiments, some or all of the methods disclosed herein may be performed using a desktop computer or any other computing device as the analyst computers 104 or crowdsourcing workstations 106. For purposes of this disclosure, discussion of communication with a user or entity or activity performed by the user or entity may be interpreted as communication with a computer 104, 106 associated with the user or entity or activity taking place on a computer associated with the user or entity.

Some or all of the server 102, analyst computers 104, and user workstations 106 may communicate with one another by means of a network 108. The network 108 may be embodied as a peer-to-peer connection between devices, a connection through a local area network (LAN), WiFi network, the Internet, or any other communication medium or system.

The server system 102 may be associated with a merchant, or other entity, providing classification services of documents. For example, the server system 102 may host a search engine or a site hosted by a merchant to provide access to information about products and user opinions about products. The server system 102 may additionally or alternatively implement a social networking site that enables the generation of content by a user. For example, the server system 102 may store, provide access to, or enable generation of, social media content for a site such as Facebook™, Twitter™, FourSquare™, LinedIn™, or other social networking or blogging site that enables the posting of content by users.

In some embodiments, the server system 102 may host or access a product database 110. The product database 110 may include one or more native product records 112a, each including attributes 114 and corresponding values 116. In particular, the native product records 112a may include attribute-value pairs each including an attribute 114 and a corresponding value 116. The native product records 112a may be part of a product catalog. The product catalog may be organized as a taxonomy and the native product records 112a may be nodes in the taxonomy. In particular, each native product record 112a may belong to one or more categories and subcategories in the taxonomy. For example, a native product record 112a may belong to one or more product types.

The product database 110 may also store one or more import records 112b. Alternatively, the import records 112b may be stored in a separate database or accessed from a separate database. The import records 112b may include attributes 114 and values 116 that are likewise organized into attribute-value pairings. The attributes 114 may include non-native attribute labels that do not correspond to attribute 114, i.e. are not textually and/or conceptually identical. Methods disclosed herein provide an improved approach for relating non-native attribute labels to the attributes 114 of the native records 112a.

One or both of the native records 112a and import records 112b may additionally include unstructured data, e.g. free form text that does not clearly indicate attribute-value pairings. Although reference is made to product records herein, the methods disclosed may be applied to other types of records as well.

Figure 2:
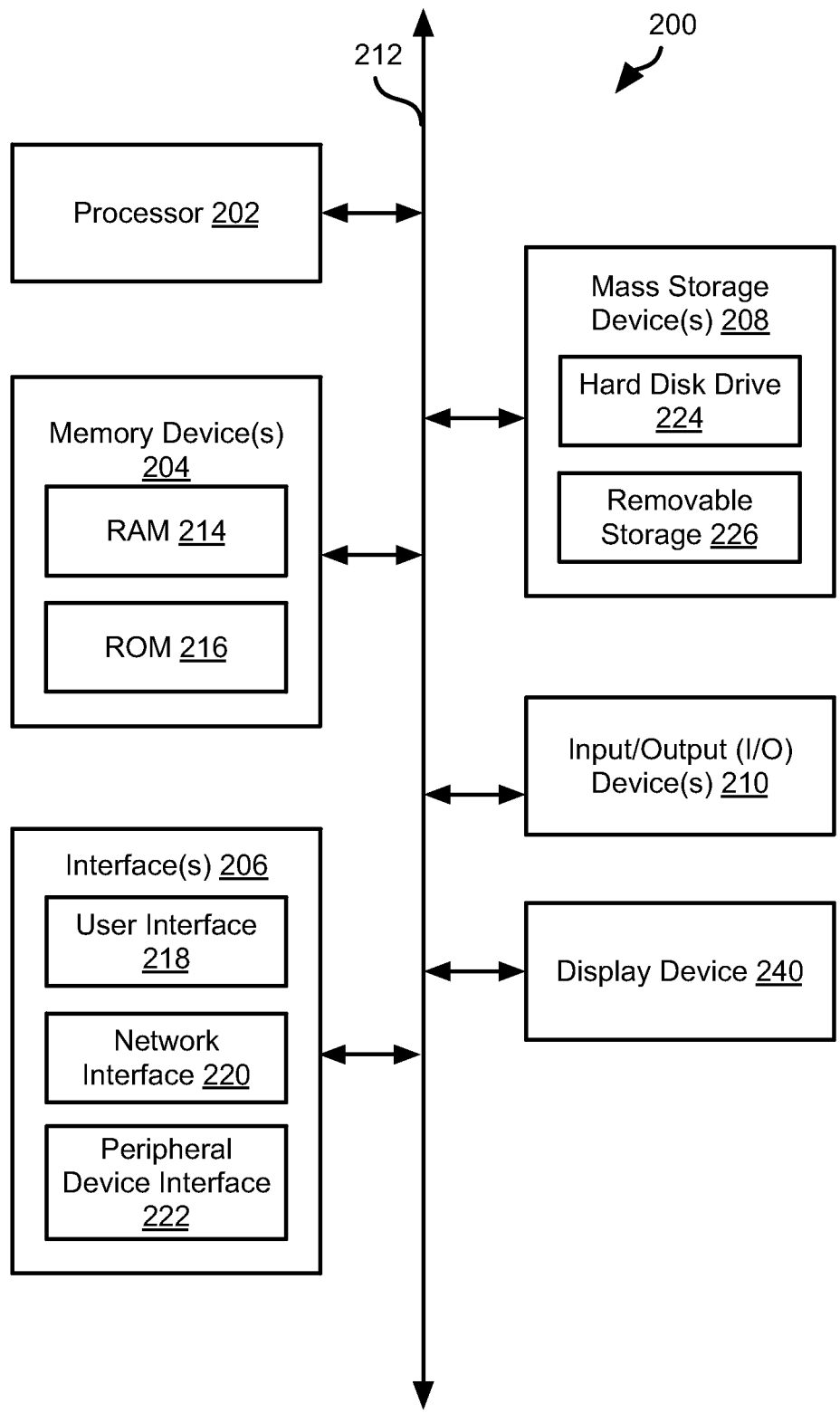
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102, analyst workstation 104, and crowdsourcing workstation 106 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
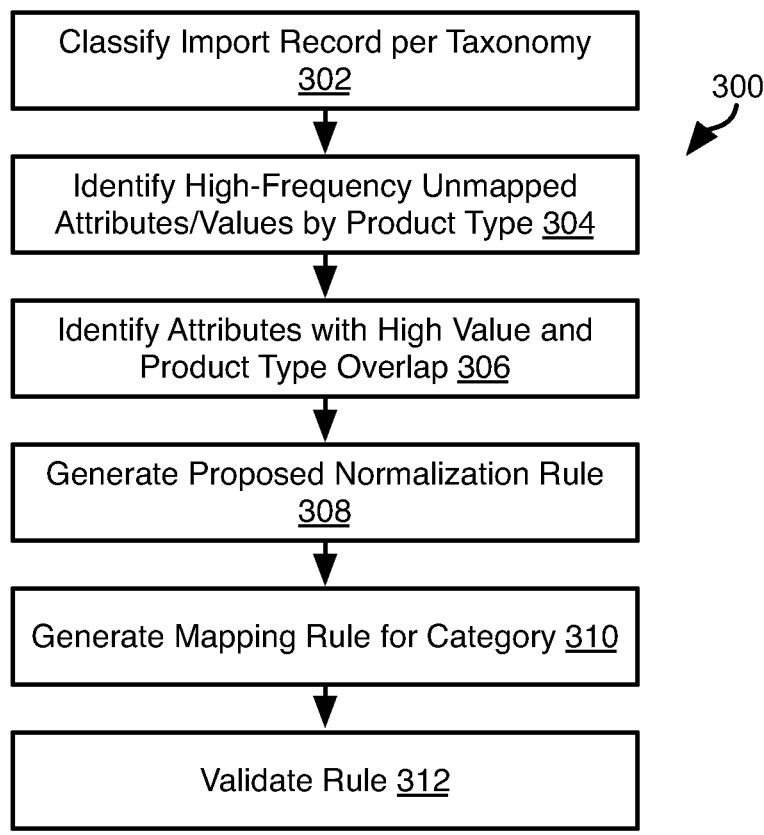
FIG. 3 is process flow diagram of a method for generating normalization rules in accordance with an embodiment of the present invention.

FIG. 3 illustrates a method 300 for generating normalization rules for import records 112b in order to relate attribute labels of the import records to attribute labels in a native schema. The method 300 may be executed by the server system 102 or by some other system providing an interface to the server system 102.

The method 300 may include classifying 302 the import records 112b according to the taxonomy. This may include classifying the import records 112b according to any classification algorithm known in the art. For example, the classifying 302 may include using the methods disclosed in U.S. application Ser. No. 13/688,060 filed Nov. 28, 2012 and entitled IDENTIFYING PRODUCT REFERENCES IN USER-GENERATED CONTENT, which is hereby incorporated herein by reference in its entirety.

Classifying 302 may include using the methods In some embodiments, related products types may be identified according to methods described in U.S. application Ser. No. 13/756,443, filed Jan. 31, 2013, which is hereby incorporated herein by reference in its entirety. Classifying 302 may also include classifying a product record using the methods disclosed in U.S. application Ser. No. 13/756,467, filed Jan. 31, 2013, which is hereby incorporated herein by reference in its entirety. Classifying 302 may also include classifying a product record using the methods disclosed in U.S. patent application Ser. No. 13/300,524, entitled "PROCESSING DATA FEEDS," filed Nov. 18, 2011, which is hereby incorporated herein by reference in its entirety.

The classified import records may then be evaluated to identify 304 attribute-value pairs in the import records 112b that do not map to attribute labels in the native schema of the native product 112a. For example, among a first group of import records classified as belonging to a first product type, the native attribute labels of native records of the first product type in the schema may be compared to attribute labels of the first group of import records. Those attribute labels in the first group not found in the schema for the first product type may be identified 304 as being unmapped. This process may be performed for each product type represented among the import records as determined by the classifying step 302.

Non-native attributes for which the attribute-value pairs including the non-native attributes have a high degree of overlap with values in attribute-value pairs for the identified 304. For example, using the example of the first group of import records, the unmapped attribute labels identified 304 for the first group may be evaluated to identify the values ("first values") associated therewith in the attribute-value pairs including the unmapped attribute labels. The first values may then be compared to values in attribute-value pairs of native records having the first product type. A non-native attribute label may have various values associated therewith. Accordingly, a first native attribute label may be identified 306 as having a high degree of overlap with a first non-native attribute label if a large number of first values for the non-native attribute overlap with values in attribute-value pairs including the first non-native attribute in native records of the first product type. A high degree of overlap may be interpreted as 100 percent overlap, e.g. all first values for a non-native attribute label overlap with values for a corresponding native attribute label. Alternatively, a lesser percentage may be used, e.g. at least 90% overlap. The above-described process with respect to the first group may be repeated for other groups identified as corresponding to a specific product type.

The method 300 may further include generating 308 a proposed normalization rule. A simple rule may simply be a one-to-one mapping. For example, a rule may have the format <product type>:<non-native attribute label>→<native attribute label>, where <product type> defines the scope of the rule, e.g. a node in a taxonomy below which the import record belongs. The <product type> may include a number of product types and may be expressed as a list or as regular expression describing a number of product type labels. The <non-native attribute label> field may be a word, regular expression, or other textual representation of a non-native label. In some embodiments, a normalization rule may take into account context in which a non-native attribute label and/or value occur in an import record. For example, a rule may be of the form <product type>:<non-native attribute, attribute context, value context, global context>→<native attribute label>. The "attribute context" field may include words surrounding the non-native attribute label in the import record, e.g. N words before and/or M words after, where N and M are equal or different and may be zero. The "value context" may be expressed in the same manner with respect to occurrence of one or more values associated with the non-native attribute label. The "global context" field may describe attributes of the import record in which the non-native attribute label occurs, such as the occurrence of one or more words anywhere in the document, a number of occurrence of one or more words, co-occurrences of pairs of words or any other grouping of words, or any other attribute of an import record known in the art of document-analysis. Any of the fields of any rule may be a word or a regular expression that could apply to multiple words, e.g. different versions of the same root word, plural and singular versions of a word, an enumerated list of words, or the like.

An example rule may include <finer categorizations|type|occasion|type|style>: <baseball (mitt?s? (and|&|\+) globes?|mitt?s?|globes?), baseball (mitt?s? (and|&\+) globes?|mitt?s?|gloves?)>–><apparel type, Baseball Mitts & Globes>.

Figure 4:
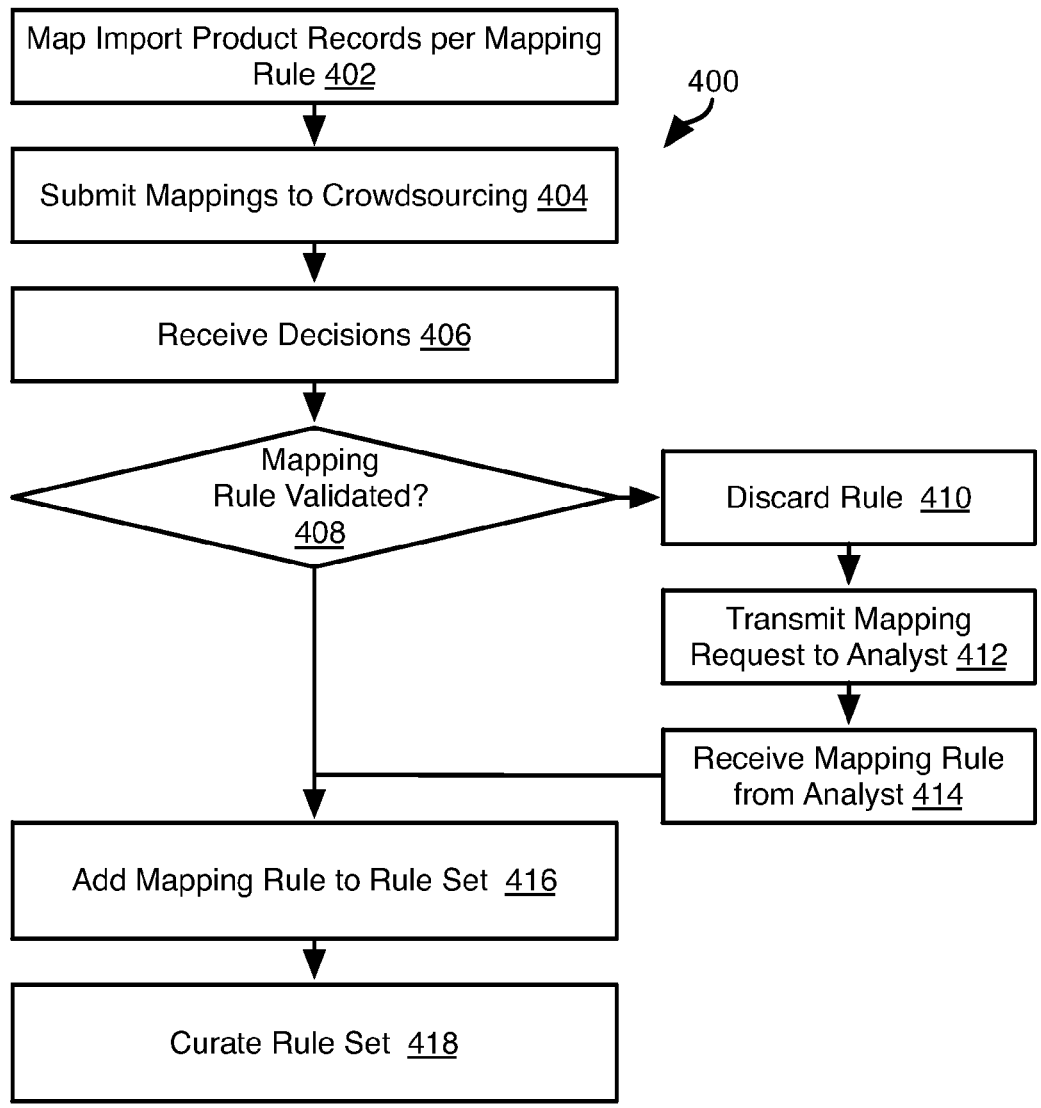
FIG. 4 is process flow diagram of a method for validating normalization rules in accordance with an embodiment of the present invention.

The rule generated 310 may then be validated 312. For example, referring to FIG. 4, validating a rule may include mapping 402 one or more import records using a mapping rule. An example method in which a rule is applied to an import record is described below with respect to FIG. 5.

The mapping may then be submitted 404 to a crowdsourcing forum, such as by transmitting the mapping to one or more crowdsourcing workstations 106. For example, a mapping may be submitted by transmitting a message including a normalized product record including attribute-value pairs including the value from the import record and an attribute label generated according to a normalization rule. In some embodiments, submitting 404 the mapping may include submitting an original import record with the normalized record. For example, an original attribute-value pair may be presented adjacent and original attribute-value pair to enable ready evaluation of the accuracy of a mapping.

The method 400 may further include receiving 406 decisions from the crowdsourcing forum. For example, decisions may validate or not validate a mapping. A decision may reference, or include an identifier used to reference, a normalization rule used to generate the mapping, the original import record, an identifier of the individual that made the decision, an indication of specific mappings (e.g. non-native attribute label to native attribute label) that are correct and/or incorrect, or other information.

The method 400 may further include evaluating 408 whether the received 406 decisions validate a rule. A rule may be considered to be validated if an above-threshold percentage or number of mappings generated according to the normalization rule were found to be accurate. The threshold percentage may be 100% or less than 100%, e.g. 90 or 95 percent.

If a rule is not found 408 to have been validated, the rule may be discarded 410. In some embodiments, the method 400 may include transmitting 412 a request to an analyst, such as to an analyst workstation 104. The request may be a request to generate an alternative mapping for a mapping found to be inaccurate, e.g. an alternative mapping from a non-native attribute label to a native attribute label. The request may include the mapping performed at step 402, e.g. a mapping according to a normalization rule.

The method may further include receiving 414 from the analyst, such as from the analyst workstation 104, one or both of an alternative mapping for a non-native attribute label of the import record that is the subject of the method 400 and an alternative normalization rule. Either of these may be generated according to human judgment or a combination of human judgment and automated analysis.

If a rule is found 408 to be validated or if an alternative normalization rule has been received 414, either of these rules may be added 416 to a set of validated rules that are used to perform normalizations on production data, i.e. to generate normalized records for use in responding to customer queries or other applications.

The method 40 may further include curating 414 the rule set. Curating 414 the rule set may include adding, modifying, or removing rules from the rule set according to human judgment. An interface to the rule set may be provided to an analyst workstation 104 to enable an analyst to view and modify the rule set.

Figure 5:
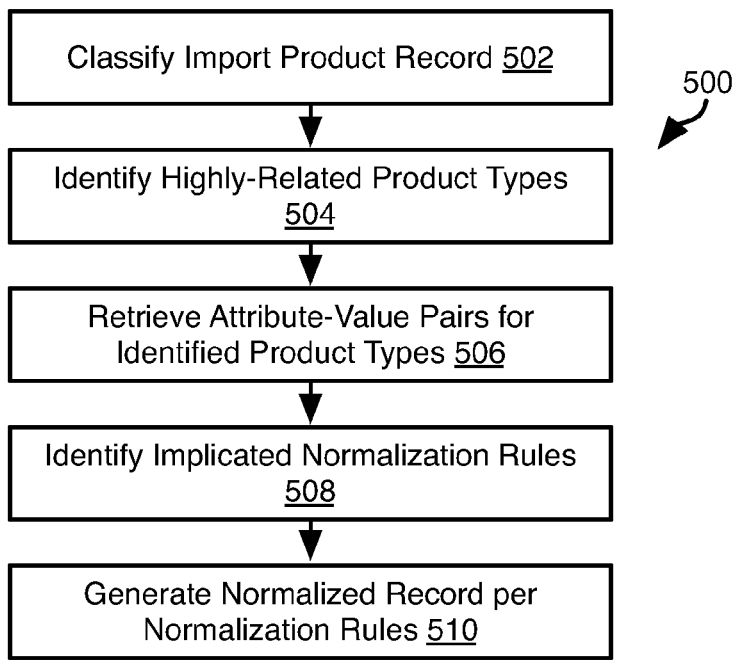
FIG. 5 is process flow diagram of a method for applying normalization rules in accordance with an embodiment of the present invention.

FIG. 5 illustrates a method 500 for applying normalization rules. The method 500 may be executed by a server system 102 or accessed by the server system 102. The method 500 may be executed with respect to an import record and may include classifying 502 the import record. Classifying 502 may include assigning the import record to a product type using any of the classification methods noted above with respect to FIG. 3.

The method 500 may further include identifying 504 one or more highly-related product types. Identifying related product types may also include classifying a product record using the methods disclosed in U.S. application Ser. No. 13/756, 467, filed Jan. 31, 2013, which is hereby incorporated herein in its entirety. For example, the top N products most closely related to the import record may be identified 504. Related product records may additionally or alternatively be identified as those belonging to a same category or subcategory as the import record in a taxonomy according to the classification step 502.

The method 500 may further include retrieving 506 attribute-value pairs for products belonging to the identified 504 product types. Using these attribute-value pairs, one or more implicated normalization rules 508 may be identified. In many applications, a very large number of normalization rules may exist. Accordingly, in some embodiments, rather than evaluating every rule with respect to each import record, normalization rules may be identified 508 as implicated that 1) have an associated product type, e.g. <product type> field, that includes the product type identified in the classification step 502 and 2) have as an output an attribute label included in the retrieved 506 attribute-value pairs. In some embodiments, all rules having a scope including the product type identified in the classification step 502 are applied rather than identifying those that are implicated.

In either case, the rules identified 508 may be applied to the import record to generate a normalized record. For example, for each implicated rule, a pattern satisfying the input may be identified, if possible. For example, a pattern may include a non-native attribute label, value, attribute label context, value context, global context, or any other parameter defining the precondition of the rule is satisfied. For each normalization rule that applies a normalized attribute label is added to the normalized record and the value for the non-native attribute label in the import record is associated with the normalized attribute label. In some embodiments, any non-native attribute label for which no normalization rule applies may be added to the normalized record along with an associated value from the import record. In other embodiments, non-native attribute labels and corresponding values for which no normalization rule applies may be omitted from the normalized record. The normalized record may be stored for subsequent use, such as responding to customer queries or any other application. The normalized records may be used in the same manner as the native records.

Figure 6:
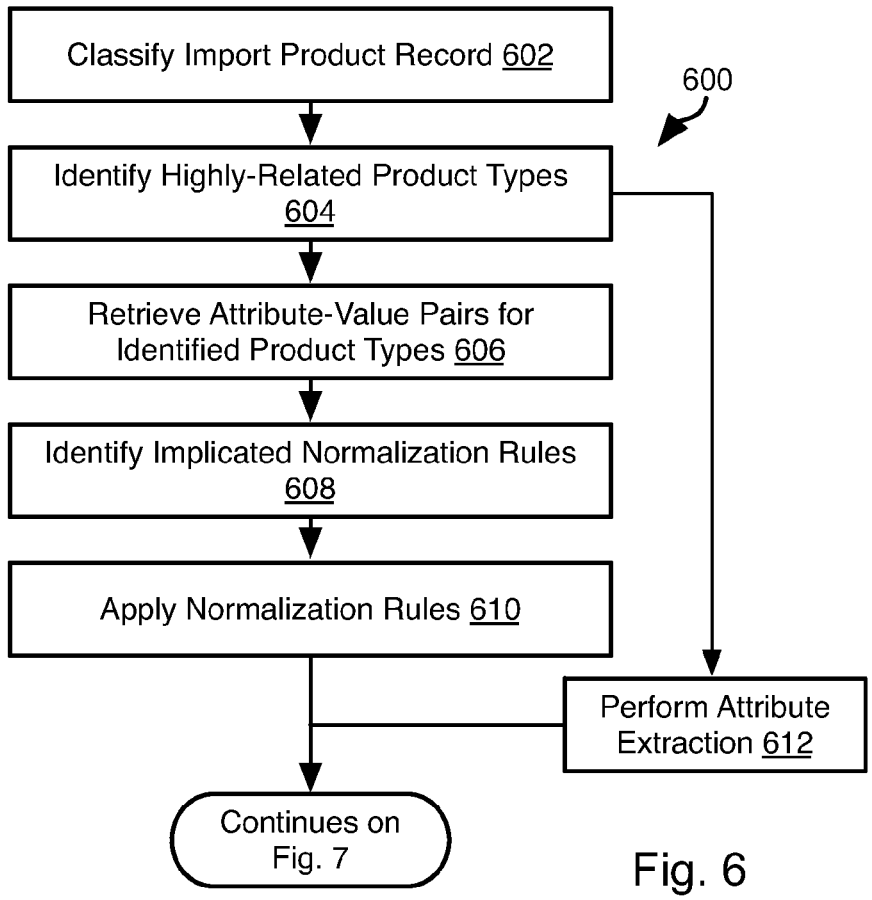
FIG. 6 is process flow diagram of an alternative method for applying normalization rules in accordance with an embodiment of the present invention.

Referring to FIG. 6, in an alternative embodiment, a method 600 may include performing some or all classifying 602 an import record, identifying 604 highly-related product types, retrieving 606 attribute-value pairs, and identifying 608 implicated normalization rules in the same manner as for the method 500.

The method 600 may further include applying 610 the implicated normalization rules. Applying 610 the implicated rules may include generating mappings between a native attribute-value pairs and normalized attribute value pairs according to one or more normalization rules. The method 600 may further include performing 612 attribute extraction on the import record. Attribute extraction may include identifying one or more candidate attributes and corresponding values in structured or unstructured data of the import record. The methods described below find particular application for import records including both structured and unstructured data. For example, the classification for the import product record and the result of attribute extraction may be input to the method 700 of FIG. 7.

Figure 7:
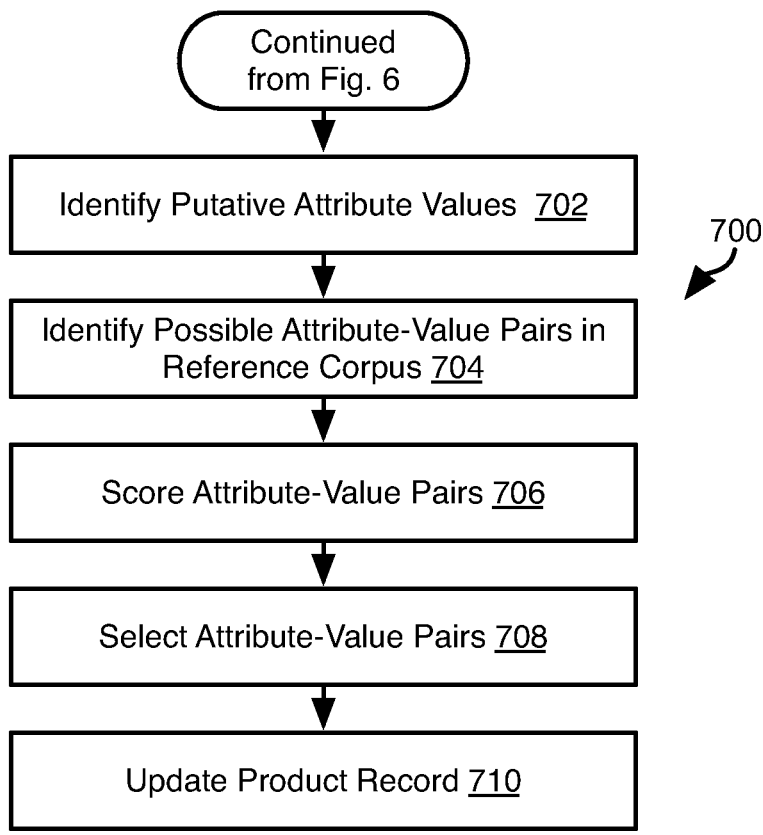
FIG. 7 is a process flow diagram of a method for identifying attributes in a document in accordance with an embodiment of the present invention.

FIG. 7 illustrates a method 700 for identifying attributes in product records. Although the methods disclosed herein are described with respect to product records, other documents may also be processed according to the methods disclosed herein. The method 700 may be executed by a server system 102 or accessed by the server system 102. The method 700 may take as inputs the results of the application of normalization rules according to step 610 and any candidate attributes, values, and attribute-value pairs for the import record processed extracted in step 612 of the method 600. For example, the method 700 may include identifying 702 values in a product record being evaluated that may correspond to a product attribute. Values may be identified according to a part of speech, e.g. adjectives, adverbs, nouns, etc. Values may be identified according to "is a" relationships, e.g. text indicating "[product] is a [value]." Methods described hereinbelow may be used to identify those attribute-value pairs that are appropriate for the product record. Accordingly, the step of identifying 702 putative values may be somewhat unrestricted in identifying potential values. For example, in some embodiments, all strings may be deemed putative values other than those strings that obviously not values, e.g. common words such as "and," "is," "the," and the like that are identified automatically or by an analyst as being unlikely to communicate a meaningful value for all product records or product records belonging to a particular category of products.

The method 700 may further include identifying 704 candidate attributes that correspond to identified 702 values. Each value may potentially have multiple candidate attributes associated therewith. In some embodiments a plurality of candidate attribute-value pairs may be identified. For example, attributes may be identified in a taxonomy, such as any schema, dictionary, or other reference corpus, according to a dictionary-based search. For example, the taxonomy may be searched for each value, e.g. a word or phrase, to identify a corresponding entry in the reference corpus that includes that word or phrase. For example, the reference corpus may include entries for some or all of products, product records, attributes, and attribute-value pairs. Accordingly, entries with attribute-value pairs including an identified 702 value may be identified 704 as a candidate attribute-value. The identified 704 attribute-value pairs may then be scored 706. An example method for scoring the attribute-value pairs is described below with respect to FIG. 9. In some embodiments, identifying 704 attribute-value pairs may include identifying explicit attribute-value pairs, e.g. structured data. In some embodiments, identifying 704 attribute-value pairs may include applying an implicated normalization rule, e.g. as described above with respect to FIG. 6, to identify a normalized attribute-value pair. Attribute labels for normalized attribute-value pairs generated according to a normalization rule may be added to the identified 704 candidate attributes.

The scores assigned to the attribute-value pairs at step 706 may then be used to select 708 one or more selected attribute-value pairs. For example, the top N attribute-value pairs with the highest scores may be selected. In some embodiments, those attribute-value pairs with scores above a threshold may be selected. Other selection criteria based on the scores may also be used. As will be described below, in some embodiments, a machine-learning algorithm may be used to select attribute-value pairs. For example, an attribute-value pair for the document may have a plurality of scores associated therewith as described below. A decision tree algorithm may process the scores in order to one or both of make a decision whether to retain or discard an attribute value pair and to generate a final score that combines the scores, with the final score being used to select attribute-value pairs, such as by comparison to a threshold.

A product record may then be updated 710 according to the selected 708 attribute-value pairs. For example, an unstructured product record may be replaced or augmented with structured attribute-value data for use in responding to queries and to assist in comparison of related products. In some embodiments, a template for a product type or category to which the product record belongs may be updated to include some or all of the selected 708 attributes from the attribute-value pairs. For example, where a significant portion, e.g. 90% or some other percentage, of product records belonging to a category have attribute-value pairs referencing the same attribute, this attribute may be added to a template for that category.

Figure 8:
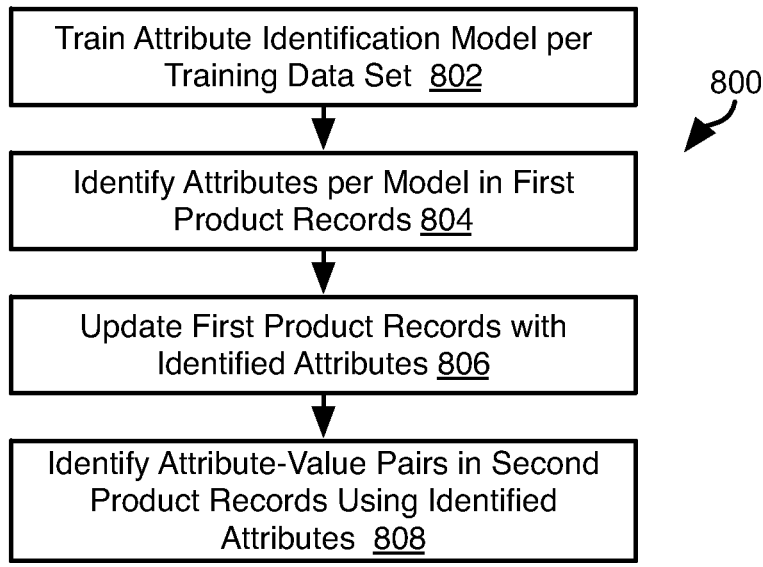
FIG. 8 is a process flow diagram of a method for processing a document corpus to generated structured records in accordance with an embodiment of the present invention.

FIG. 8 illustrates a method 800 in which attribute-value pairs identified according to the method 700 for a product record may be used. The method 800 may be executed by a server system 102 or accessed by the server system 102.

The method 800 may include training 802 an attribute identification model using a training data set. The entries of the training data set may each include as an input an unstructured description of a product. The entries of the training data set may each include as an output attribute-value pairs corresponding to the unstructured description of the input. The attribute-value pairs of the output may be associated with the unstructured data of the input according to human judgment, such as by analysts or using structured data provided by a manufacturer or retailer for the product described in the unstructured data. Using the training data, scores may be calculated for each entry, such as according to the method 900 of FIG. 9, described below. These scores may then be used to train a machine learning model, such as a decision tree model, to relate the scores for the inputs to the attribute-value pairs specified in the outputs for the training data.

Using the attribute identification model as trained 802, attributes, such as attribute-value pairs, may be identified 804 in first product records. The first product records may include unstructured data exclusively or may include both structured and unstructured data. Identifying 804 attributes in the first product records may include performing the method 700 with respect to the first product records.

Using the attributes, such as attribute-value pairs, identified at step 804, the first product records may be updated 806. As noted above, this may include adding the attribute-value pairs to the product record or creating a new product record including the attribute-value pairs. As also noted above, a product template for a product category to which the product record belongs may also be updated to include one or more of the identified 804 attributes.

The attribute-value pairs associated with the first product records and any updates to a product template may be used for any purpose for which structured data may be useful. In particular, comparable products may be presented for viewing to a user with attributes presented in a way to enable ready comparison, such as side-by-side display of attributes. As shown in FIG. 8, the attributes identified according to methods disclosed herein may also be used to identify 808 attribute-value pairs in second product records. For example, attribute-value combinations with which a first product record is labeled may be used to identify references to a product in second product records based on attribute mentions in documents that do not explicitly identify the product associated with a product record, such as described in U.S. application Ser. No. 13/688,060 filed Nov. 28, 2012 and entitled IDENTIFYING PRODUCT REFERENCES IN USER-GENERATED CONTENT, which is hereby incorporated herein by reference in its entirety.

Figure 9:
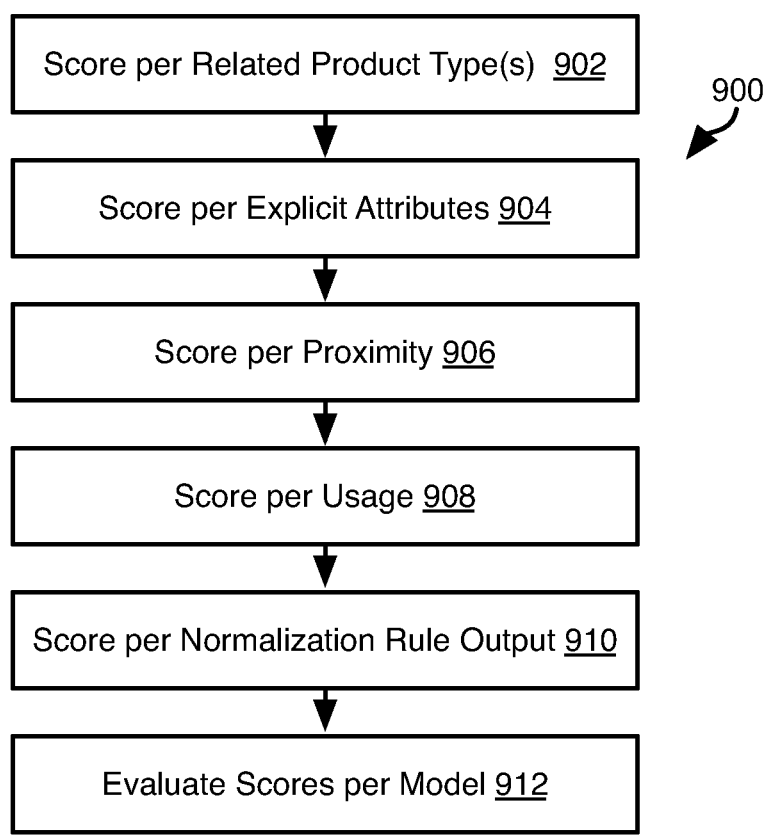
FIG. 9 is a process flow diagram of a method for evaluating candidate attributes in accordance with an embodiment of the present invention.

FIG. 9 illustrates a method 900 for assigning scores to candidate attribute-value pairs of a product record for use in selecting attribute-value pairs. The scores according to the steps described herein may assign numeric score that may have various values in range. Some or all of the scores assigned as described below may also be binary values, e.g. 1 or 0, true or false, or some other pair of values.

The method 900 may include scoring 902 the product record according to one or more related product types. A related product type may be identified using any classification algorithm known in the art, such as a search engine that identifies documents relevant to a prompt embodied as the product record, where the documents are nodes in a taxonomy. In some embodiments, related products types may be identified according to methods described in U.S. application Ser. No. 13/756,443, filed Jan. 31, 2013, which is hereby incorporated herein by reference. Identifying related product types may also include classifying a product record using the methods disclosed in U.S. application Ser. No. 13/756,467, filed Jan. 31, 2013, which is hereby incorporated herein by reference.

In some embodiments, scoring 902 the product record according to identified product type may include selecting the top N, e.g. 5, product types identifies as being most relevant to the product record. A score based on product type may be of the form Product_Type_A=1, indicating that product type "A" is one of the identified product types. In other embodiments, attributes associated with the identified product types may be compared to the candidate attribute-value pairs for the product record. For example, the product types may include structured records that identify a set of attributes common to products belonging to the product types. Accordingly, a candidate attribute-value pair of the product record may be scored 902 based on the identified product types according to whether or not the attribute of the attribute-value pair matches an attribute in the top N related product types. Accordingly, a score assigned to an attribute-value pair based on product type may be of the form Product_Type_Match=1, if the attribute of the attribute-value pair matches one of the identified product types. In some embodiments, the score assigned may be of the form Product_Type_Count=M, where M is the number of the identified product types that include the attribute of the attribute-value pair. In still other embodiments, the score assigned may be of the form, Product_Type_A_Match=1, where A is one of the identified product types and the value is set to 1 if the attribute of an attribute value pair matches an attribute of product type A. Scores of this same form may be assigned (1 or 0) for each identified product type for each attribute-value pair in some embodiments.

The method 900 may include assigning 904 a score to candidate attribute-value pairs of the product record according to explicit attributes. In some embodiments, a product record may be ingested from an outside entity and may include both structured and unstructured data. Accordingly, assigning 904 a score to an attribute-value pair based on explicit attributes may include assigning a positive (e.g. 1, true, yes) binary value to the attribute-value pair is one or both of the attribute and value are explicitly specified as an attribute and value, respectively, e.g. Explicit_Attribute=1.

The method 900 may include assigning 906 scores to attribute-value pairs of the product record based on proximity. For example, if the product record includes a textual representation of the attribute of the attribute value pair, a score may be assigned according to a separation between the value and the attribute. For example, a score may be assigned as Attribute_Proximity=3, where three words separate the attribute and value. Where a textual representation of the attribute isn't present, the value may be assigned as Attribute_Proximity=NaN (not a number), or some other value indicating that the attribute is not present within the product record itself.

Assigning 906 a score to an attribute-value pair may further include assigning one or more scores according to proximity to words other than the attribute. For example, one or more scores may be assigned to an attribute-value pair according to one or more words preceding or following the value in the product record. For example, a whitelist of words indicative of importance of a value may be maintained. Accordingly, a score assigned according to preceding or following words may be of the form WhitelistWord_Following=1(true), WhitelistWord_Following=3 (e.g. 3 words separation), where "WhitelistWord" is a word in the whitelist. A score may also be assigned according to blacklist words in the same manner, where a blacklist word is a word that indicates that a proximate word is likely not important.

The method 900 may include assigning 908 the candidate attribute-value pairs scores according to usage in the product record or elsewhere. For example, in some embodiments, a score may be assigned to an attribute-value pair according to global usage, such as an inverse document frequency score (IDF) for a corpus of product records or some other corpus.

In some embodiments, a score may be assigned to an attribute-value pair according to a part of speech the value fulfills in the product record, e.g. noun, adjective, adverb, verb, etc. For example, a score according to part of speech may be assigned as Is_Noun=1 (e.g. true).

In some embodiments, a score may be assigned to an attribute-value pair according to a number of occurrences of the value, or forms of the same root word as value, in the product record. For example, a score may be assigned to an attribute-value pair as Usage_Count=N.

In some embodiments, a score may be assigned to an attribute-value pair according to where one or more instances of the value occur. For example, a value may be assigned a score Title=True, First_Paragraph=True, or the like. In some embodiments, an attribute-value pair may be assigned a score according to whether one or more instances of the value occur in a hyperlink, e.g. In_Hyperlink=True, or In_Hyperlink=N, where N is a number of instances in hyperlinks to unique URLs (uniform resource locators). In some embodiments, an attribute-value pair may be assigned a score according to where an instance of the value occurs in a sentence and/or the role the word plays in the sentence, e.g. First_Word=1, Last_Word=true, Is_Subject=1, Is_Object=true, Is_Direct_Object=false, or the like.

In some embodiments, a score may be assigned to a value based on usage of the value in a taxonomy. For example, if a value is included in a superstring in a title of a node in the taxonomy, a score may be assigned accordingly. For example, if a value is the numeral "7" and a node in the taxonomy is "Windows 7," the attribute-value pair including 7 may be assigned a score In_Superstring=1.

In some embodiments, an attribute-value pair may be assigned a score according to whether the attribute corresponds to a sense in which the value of the pair is used in the product record. Various methods exist for performing word sense disambiguation (WSD). Any of such methods may be used to determine a sense of the value. Accordingly, a score may be assigned to an attribute-value pair as Is_Correct_Sense=1, if the attribute corresponds to the sense of the value according to WSD. In other embodiments, the attribute-value pair may be assigned a score as Correct_Sense=x, where x is a score or rank assigned to the attribute of the attribute value pair according to a WSD algorithm.

In some embodiments, a score may be assigned to an attribute-value pair according to whether the attribute and/or value of the pair corresponds to a main topic or concept associated with the product record. Various methods exist to identify one or more topics to which a document relates. Accordingly, a score may be assigned to an attribute-value pair as one of more of Is_Topical=1, Attribute_Is_Topical=1, Value_Is_Topical=1, or the like according to whether the attribute and/or value correspond to a topic associated with a product record, e.g. the top N topics associated with a product record. In some embodiments, concepts and/or topics associated with a product record may be extracted according to the methods disclosed in U.S. patent application Ser. No. 13/300,524, entitled "PROCESSING DATA FEEDS," filed Nov. 18, 2011, which is hereby incorporated herein by reference in its entirety.

The method 900 may include assigning 910 to the candidate attribute-value pairs scores according to one or more normalization rules, such as normalization rules described hereinabove. For example, if a candidate attribute-value pair is the result of application of a normalization rule, then a score or flag may be set for that attribute-value pair. In some embodiments, a candidate attribute-value pair that is the result of a validated normalization rule may be scored highly inasmuch as it is likely to be a valid attribute-value pair.

Some or all of the scores assigned as described hereinabove may then be evaluated 912 using a machine learning model trained as described hereinabove to evaluate the relevance of an attribute-value pair to scores as described above. As noted above, the machine learning model may be a decision tree model or some other machine learning algorithm. Other means for relating scores to training data may also be used such as logistic regression or other statistical method. In some embodiments, an outcome of the learning model is a binary value indicating that an attribute-value pair is or is not relevant (e.g. should be retained or discarded). In other embodiments, the model may output a score that may be used to rank attribute-value pairs. Those attribute-value pairs with scores above a threshold may then be retained for the product record. In other embodiments, the top N attribute-value pairs with the highest scores from the model may be retained for use according to methods described herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for classification, the method comprising:
identifying, by a computer system, in one or more import records, a plurality of attribute-value pairs each having: an attribute label not found in a native schema; and a value;
identifying, by the computer system, one or more attribute labels in the native schema having as possible values one or more values corresponding to values of the plurality of attribute-value pairs;
generating, by the computer system, one or more normalization rules relating the one or more attribute labels of the plurality of attribute-value pairs to at least a portion of the one or more attribute labels in the native schema;
normalizing a plurality of non-normalized records according to the one or more normalization rules to generate a plurality of provisionally normalized records;
transmitting the plurality of provisionally normalized records to a crowdsourcing forum;
receiving, from the crowdsourcing forum, one or more favorable validation decisions with respect to a first portion of the plurality of provisionally normalized records;
receiving, from the crowdsourcing forum, one or more unfavorable validation decisions with respect to a second portion of the plurality of provisionally normalized records;
identifying one or more first normalization rules from the one or more normalization rules, the one or more first normalization rules corresponding to the first portion of the plurality of provisionally normalized records; and
adding the one or more first normalization rules to a validated rule set.

2. The method of claim 1 wherein:
the one or more import records are a plurality of import records; and
identifying in the one or more import records a plurality of attribute-value pairs further comprises identifying as the plurality of attribute-value pairs those attribute-value pairs in the plurality of import records having high frequency of usage relative to other attribute-value pairs in the plurality of import records having attribute labels not found in the native schema.

3. The method of claim 1 wherein:
the one or more import records are a plurality of import records; and
identifying in the one or more import records a plurality of attribute-value pairs further comprises:

classifying a first portion of the one or more import records as being of a first type according to a taxonomy;
classifying a second portion of the one or more import records as being of a second type according to the taxonomy; and
identifying as the plurality of attribute-value pairs:
    a first group of attribute-value pairs in the first portion having high frequency of usage relative to other attribute-value pairs in the first portion and not found in the native schema; and
    a second group of attribute-value pairs in the second portion having high frequency of usage relative to other attribute-value pairs in the second portion and not found in the native schema.

4. The method of claim 3 wherein the generating the one or more normalization rules relating the one or more attribute labels of the plurality of attribute-value pairs to the at least the portion of the one or more attribute labels in the native schema further comprises:
generating one or more first rules for the first portion, the one or more first rules having the first type associated therewith; and
generating one or more second rules for the second portion, the one or more second rules having the second type associated therewith.

5. The method of claim 4 further comprising:
receiving a non-normalized record;
classifying the non-normalized record as belonging to a selected type including one of the first type and the second type;
normalizing the non-normalized record according to one of the one or more first rules and the one or more second rules corresponding to the selected type to generate a normalized record; and
storing the normalized record in a database.

6. The method of claim 5 wherein the non-normalized record is a product record and the database is a product catalog.

7. The method of claim 1 further comprising:
identifying, one or more second normalization rules from the one or more normalization rules, the one or more second normalization rules corresponding to the second portion of the plurality of provisionally normalized records; and
discarding the one or more second normalization rules.

8. The method of claim 7 further comprising:
transmitting at least one of the second portion of the plurality of provisionally normalized records and the one or more second normalization rules to an analyst workstation network with an instruction to generate a valid normalization rule; and
receiving, from the analyst workstation network, at least one validated normalization rule.

9. A system for classification, the system comprising one or more processors and one or more memory devices operably coupled to the one or more memory devices, the one or more memory devices storing executable and operational data effective to cause the one or more processors to:
identify in one or more import records a plurality of attribute-value pairs each having: an attribute label not found in a native schema; and a value;
identify one or more attribute labels in the native schema having as possible values one or more values corresponding to values of the plurality of attribute-value pairs;
generate one or more normalization rules relating the one or more attribute labels of the plurality of attribute-value pairs to at least a portion of the one or more attribute labels in the native schema;
normalize a plurality of non-normalized records according to the one or more normalization rules to generate a plurality of provisionally normalized records;
transmit the plurality of provisionally normalized records to a crowdsourcing forum;
receive, from the crowdsourcing forum, one or more favorable validation decisions with respect to a first portion of the plurality of provisionally normalized records;
receive, from the crowdsourcing forum, one or more unfavorable validation decisions with respect to a second portion of the plurality of provisionally normalized records;
identify one or more first normalization rules from the one or more normalization rules, the one or more first normalization rules corresponding to the first portion of the plurality of provisionally normalized records; and
add the one or more first normalization rules to a validated rule set.

10. The system of claim 9, wherein:
the one or more import records are a plurality of import records; and
the executable and operational data are further effective to cause the one or more processors to identify in the one or more import records a plurality of attribute-value pairs by identifying as the plurality of attribute-value pairs those attribute-value pairs in the plurality of import records having high frequency of usage relative to other attribute-value pairs in the plurality of import records having attribute labels not found in the native schema.

11. The system of claim 9 wherein:
the one or more import records are a plurality of import records; and
the executable and operational data are further effective to cause the one or more processors to identify in the one or more import records a plurality of attribute-value pairs by:
    classifying a first portion of the one or more import records as being of a first type according to a taxonomy;
    classifying a second portion of the one or more import records as being of a second type according to the a taxonomy; and
    identifying as the plurality of attribute-value pairs:
        a first group of attribute-value pairs in the first portion having high frequency of usage relative to other attribute-value pairs in the first portion and not found in the native schema; and
        a second group of attribute-value pairs in the second portion having high frequency of usage relative to other attribute-value pairs in the second portion and not found in the native schema.

12. The system of claim 11 wherein the executable and operational data are further effective to cause the one or more processors to generate the one or more normalization rules relating the one or more attribute labels of the plurality of attribute-value pairs to the at least the portion of the one or more attribute labels in the native schema by:
generating one or more first rules for the first portion, the one or more first rules having the first type associated therewith;
generating one or more second rules for the second portion, the one or more second rules having the second type associated therewith.

13. The system of claim 12 wherein the executable and operational data are further effective to cause the one or more processors to:
- receive a non-normalized record;
- classify the non-normalized record as belonging to a selected type including one of the first type and the second type;
- normalize the non-normalized record according to one of the one or more first rules and the one or more second rules corresponding to the selected type to generate a normalized record;
- store the normalized record in a database.

14. The system of claim 13 wherein the non-normalized record is a product record and the database is a product catalog.

* * * * *